United States Patent [19]

Antonio et al.

[11] 3,964,339

[45] June 22, 1976

[54] END HOLDERS FOR HANDLE BARS

[75] Inventors: Anthony I. Antonio, Somerville, N.J.; Fernando V. Guerrero, Yardley, Pa.

[73] Assignee: Air Products and Chemicals, Inc., Allentown, Pa.

[22] Filed: May 19, 1975

[21] Appl. No.: 578,587

[52] U.S. Cl. .............................. 74/551.9; 138/96 R; 285/DIG. 22; 403/297
[51] Int. Cl.² .......................................... B62K 21/26
[58] Field of Search ............... 74/551.9, 558, 558.5; 403/297; 285/DIG. 22; 138/96 R, 109

[56] References Cited
UNITED STATES PATENTS

| 450,906 | 4/1891 | Blakely | 74/551.9 |
|---|---|---|---|
| 1,421,098 | 6/1922 | Phillips | 74/551.9 |
| 2,618,986 | 11/1952 | Hungerford | 74/551.9 |

FOREIGN PATENTS OR APPLICATIONS

| 970,663 | 1/1951 | France | 74/551.9 |
|---|---|---|---|
| 52,871 | 2/1942 | Netherlands | 74/551.9 |

Primary Examiner—Benjamin W. Wyche
Assistant Examiner—F. D. Shoemaker
Attorney, Agent, or Firm—Russell L. Brewer; Barry Moyerman

[57] ABSTRACT

This invention relates to an improved holder for tape that is wound about a tubular bar e.g., handle bar as for example, on a bicycle where the tape is fastened at the end of the handle bar. The holder comprises an expandable hub which can be inserted into the handlebar for expansion against the wall of the handle bar, the hub having a tapered aperture therein and a cylindrical core having a diameter slightly smaller than the tapered aperture at its largest opening and a larger diameter at its narrowest dimension for easy insertion into the hub. The core has a groove extending circumferentially about the exterior for defining a lip which can engage the end of the hub for providing a tight seal.

2 Claims, 4 Drawing Figures

END HOLDERS FOR HANDLE BARS

BACKGROUND OF THE INVENTION

As is known, tubular bars e.g., handle bars are widely used for hand-guided equipment such as bicycles, tricycles, motor scooters, motor cycles, golf clubs, hammers, ski poles and the like. Flexible grips have been provided on such tubular bars in order to provide comfort to the user and to permit grasping by the hand. Generally, these grips are tubular shaped, and adapted to slip over the end of the tubular bar. The grips then are glued or rely on frictional engagement to hold them in place.

More recently it has become fashionable to wind the tubular bars with a decorative tape of thermoplastic material. Ofter the tapes serves to provide not only a decorative appearance, but better grip and greater comfort to the user.

DESCRIPTION OF THE PRIOR ART

In the past, it has been common practice to secure tape which is spirally wound about a tubular or handle bar, such as for example as found on a bicycle by placing a cap over the tape and the handlebar. The cap then holds the tape by frictional engagement against the handle bar surface.

It has been common practice to place an end of the tape inside the handlebar and drive a plug of resilient material into the handlebar. Both smooth and groove shaped plugs have been used for accomplishing this result.

Although these techinques have been used with some success for securing the tape about the handlebar surface, they are relatively easy to remove from the end of the handlebar. If the plugs are removed from the handlebar, then the user may face danger to the extent that the grip may loosen and thereby lose control over the equipment or he may be cut by the exposed end of the handlebar. Consumer safety and protection groups have advocated standards that are to be followed if tapes are to be secured by a cap or plug method. The plugs commonly used in the past did not always meet the standards).

SUMMARY OF THE INVENTION

Basically, this invention relates to a holder for a tape wound about and fastened at an end of a tubular shaped cylindrical handle bar for hand guided equipment which comprises:

an expandable hub having a generally cylindrical shaped body of slightly smaller diameter than said handle bar, a rounded cap section having a brim of sufficient diameter for abutting the end of said handle bar, and an aperture through said hub and said cap section, said aperture tapering from said cap section to the other end of said hub with the largest dimension at the other end of said hub; and a solid generally cylindrical core having a slightly smaller diameter than said aperture at said cap section but a slightly larger diameter than said aperture at its narrowest dimension, a rounded face section at one end of said core for sealing engagement with said cap section of said hub, and a groove spaced apart from said face section and extending circumferentially about the exterior of said core for defining a lip, the distance between said face section and said lip section on said core being slightly greater than the length of said hub, whereby when said core is inserted into said hub, the face section of said core is in sealing engagement with the cap section of said hub and said lip section is engagement with the other end of said hub.

Advantages of this invention include a holder for tape spirally wound about a handle bar which is extremely difficult to remove from the handle bar; and a holder which is decorative and yet provides protection to the user by sealing the ends of the handle bar for preventing cuts and the like.

THE DRAWINGS

DESCRIPTION OF THE PREFERRED EMBODIMENTS

Figure 1:
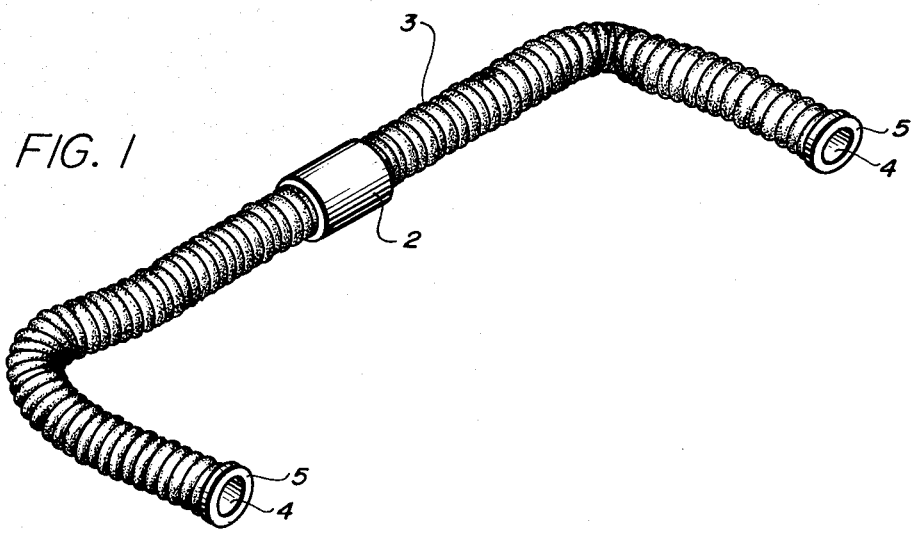
FIG. 1 is a perspective view showing a handle bar for a bicycle on which a grip is formed by winding a tape about the handle bar and secured with the holders of this invention.

Referring to the drawings, FIG. 1 is a perspective view of a handle bar. It is tubular and generally circular in shape. The handle bar 2 is wound spirally with a flat, decorative tape 3, such as for example, the type disclosed in U.S. Pat. No. 3,200,694. The tape 3 is inserted into an end of the handle bar and sealed with a holder comprising a hub 4 and a core 5.

Figures 2, 3:
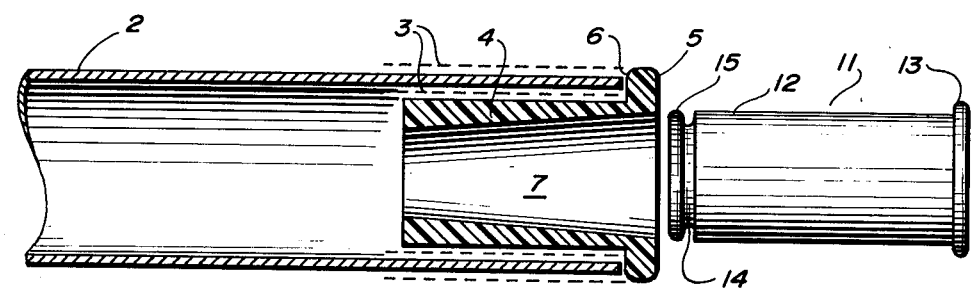
FIG. 2 is a cross-sectional view of the handle bar with the hub of the holder inserted into the handle bar.
FIG. 3 is a side view of the core.

FIG. 2 is a view in cross-section of the handle bar of FIG. 1 showing the hub inserted into the tubular handle bar. In detail, tubular handle bar 2 has a tape 3 wound about its external surface with the end of tape 3 tucked inside the handle bar. The holder for sealing tape 3 against the handle bar comprises an expandable hub 4 which is cylindrical in shape and slightly smaller in diameter than tubular handle bar 2. At one end of the hub 4 there is a cap section 5 having a generally rounded top and a generally flat brim 6. The cap section serves to close the end of the handle bar with the brim 6 abutting and in sealing engagement with the end of the handle bar to prevent cuts and the like to the user. The cap is generally rounded to provide decorative and safety features. The hub has a tapered aperture 7 which extends through the hub from end to end. The aperture has its largest dimension in the cap section and its narrowest dimension at the other end.

Figure 4:
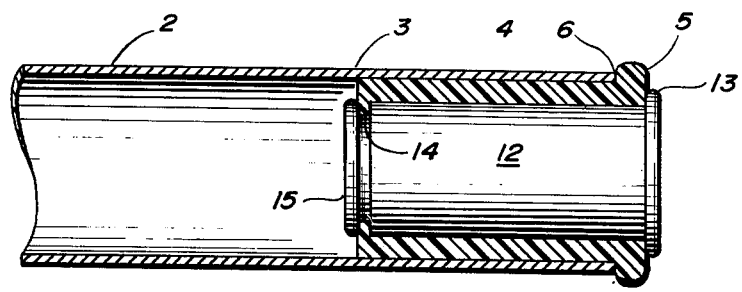
FIG. 4 is a view of the handle bar of FIG. 2 with the core of FIG. 3 inserted into the hub for sealing engagement with the handle bar.

In FIG. 3, core 11 has a generally cylindrical shaft 12 which is smaller in diameter than the largest dimension, but larger than the narrowest dimension of tapered aperture 7. Shaft 12 is bordered at one end by a rounded or mushroom shaped face section 13 with the face conforming to the rounded cap section 5 on hub 4 for sealing engagement between face section 13 and cap section 5. Spaced apart from the rounded face section 13 is a groove 14, extending circumferentially about shaft 12 for defining a lip section 15. The distance between rounded face section 13 and lip section 15 is slightly greater than the length of hub 4 from the cap section 5 to its opposite end. When the core is driven into the hub as shown in FIG. 4, the core causes hub 4 to expand for sealing engagement with the inside wall of tubular handle bar 2. The cap section 5 on the hub is firmly wedged against the end of handle bar 2 and brim 6 provides sealing engagement therewith.

The core provides for sealing expansion of the hub against the tape and tubular handle bar in the following way. Shaft 12 by virtue of its being wedged in tapered aperture 7 effects expansion perpendicular to the longitudinal axis of the shaft. Expansion also may be effected by compression of hub 4 by virtue of face section 13 being in sealing engagement with cap section 5 and lip section 15 with the opposite end of the hub. Because the aperture at the end of the hub is smaller in diameter than shaft 12 and because the core is slightly longer than the hub, the hub can nestle in groove 14 thereby pulling the end of the hub toward cap section 5. The lip section also provides a means for preventing removal of core 13 from the hub as the lip section expands by virtue of its being outside of tapered aperture 7 and locks against the end of the hub. Cores not having a lip section can work their way out of the hub.

The combination of the hub and core as described herein provides for substantial frictional engagement with the tape and tubular handle bar and is virtually impossible to remove. Because of the excellent adherence of the holder in the tubular handle bar, the grips are firmly secured to the external wall of the handlebar and safety and protection is provided to the user and the holder cannot be removed either accidentally, or by small children.

The hub and core generally are made of elastomeric materials. The hub should be made of an expandable material so that it can engage the tubular handle bar. Typical materials suited for the hub include flexible vinyl chloride, polyethylene, ethylene-vinyl acetate, rubber e.g., SBR and other soft plastic or elastomers. The core, on the other hand, can be made of an expandable material; however, it should be rigid enough to effect expansion of the hub. Suitable materials for making the core include steel and other metals, flexible vinyl or rigid vinyl, chloride, polyethylene, polypropylene, nylon, and other rigid or semi-rigid plastics.

What is claimed is:

1. A holder for a tape wound about and fastened at an end of a tubular shaped cylindrical bar for hand guided equipment which comprises:

an expandble hub having a generally cylindrical shaped body of slightly smaller diameter than said tubular bar, a rounded cap section having a brim of sufficient diameter for abutting the end of said tubular bar, and an aperture through said hub and said cap section, said aperture tapering from said cap section to the other end of said hub with the largest dimension at the cap section and its narrowest at the other end; and a solid cylindrical core having a slightly smaller diameter than said aperture at said cap section but a slightly larger diameter than said aperture at its narrowest dimension, a rounded face section at one end of said core for sealing engagement with said cap section of said hub, and a groove spaced apart from said face section and extending circumferentially about the exterior of said core for defining a lip, the distance between said face section and said lip section on said core being slightly greater than the length of said hub, whereby when said core is inserted into said hub, the face section of said core is in sealing engagement with the cap section of said hub and said lip section is engagement with the other end of said hub.

2. The holder of claim 1 wherein said hub and said core are made of vinyl chloride.

* * * * *